United States Patent
Kondo et al.

(10) Patent No.: US 8,201,097 B2
(45) Date of Patent: Jun. 12, 2012

(54) INFORMATION PROCESSING APPARATUS, DISPLAY CONTROL METHOD, AND PROGRAM

(75) Inventors: Hirohito Kondo, Kanagawa (JP); Akari Hoshi, Tokyo (JP); Satoshi Akagawa, Tokyo (JP); Tomohiro Tsuyuhara, Kanagawa (JP); Zhezhu Jin, Saitama (JP)

(73) Assignee: Sony Corporation, Tokyo (JP)

( * ) Notice: Subject to any disclaimer, the term of this patent is extended or adjusted under 35 U.S.C. 154(b) by 900 days.

(21) Appl. No.: 11/955,877

(22) Filed: Dec. 13, 2007

(65) Prior Publication Data
US 2008/0189630 A1   Aug. 7, 2008

(30) Foreign Application Priority Data
Jan. 5, 2007 (JP) ................................. 2007-000347

(51) Int. Cl.
*G06F 3/048* (2006.01)
*G06F 3/00* (2006.01)

(52) U.S. Cl. ........ 715/767; 715/764; 715/766; 715/773; 715/802; 715/854; 715/819; 715/825; 715/828

(58) Field of Classification Search .................. 715/764, 715/766, 767, 773, 802, 810, 816, 828, 829, 715/854, 819, 825
See application file for complete search history.

(56) References Cited

U.S. PATENT DOCUMENTS

| | | | |
|---|---|---|---|
| 6,028,604 A * | 2/2000 | Matthews et al. ............. | 715/821 |
| 6,202,212 B1 * | 3/2001 | Sturgeon et al. ............. | 725/141 |
| 6,266,059 B1 * | 7/2001 | Matthews et al. ............. | 715/810 |
| 6,313,851 B1 * | 11/2001 | Matthews et al. ............. | 715/718 |
| 6,344,865 B1 * | 2/2002 | Matthews et al. ............. | 715/815 |
| 6,469,721 B2 * | 10/2002 | Matthews et al. ............. | 715/830 |
| 6,724,405 B2 * | 4/2004 | Matthews et al. ............. | 715/773 |
| 6,898,765 B2 * | 5/2005 | Matthews et al. ............. | 715/815 |
| 7,421,472 B1 * | 9/2008 | Ross, Jr. ........................ | 709/206 |
| 7,562,309 B2 * | 7/2009 | Matthews et al. ............. | 715/827 |
| 7,624,192 B2 * | 11/2009 | Meyers et al. ................. | 709/238 |
| 2001/0030667 A1 * | 10/2001 | Kelts ............................. | 345/854 |
| 2002/0027571 A1 * | 3/2002 | Matthews et al. ............. | 345/827 |
| 2002/0080154 A1 * | 6/2002 | Matthews et al. ............. | 345/700 |
| 2002/0085042 A1 * | 7/2002 | Matthews et al. ............. | 345/810 |
| 2003/0067446 A1 | 4/2003 | Ono et al. | |

(Continued)

FOREIGN PATENT DOCUMENTS

CN   1879078 A   12/2006
(Continued)

OTHER PUBLICATIONS

Office Action issued Dec. 16, 2010, in Japanese Patent Application No. 2007-000347.

(Continued)

*Primary Examiner* — Nicholas Augustine
(74) *Attorney, Agent, or Firm* — Oblon, Spivak, McClelland, Maier & Neustadt, L.L.P.

(57) ABSTRACT

An information processing apparatus includes a detector and a display controller. The detector detects a user operation performed by using a first input interface and a user operation performed by using a second input interface. When the detector detects that an operation using the second input interface has been performed while a predetermined screen is displayed on the basis of detection of an operation using the first input interface, the display controller changes the predetermined screen to a screen containing an object indicating that the object can be operated by an operation using the second input interface.

10 Claims, 12 Drawing Sheets

U.S. PATENT DOCUMENTS

| | | |
|---|---|---|
| 2003/0076367 A1 * | 4/2003 | Bencze et al. ............... 345/861 |
| 2004/0189715 A1 * | 9/2004 | Matthews et al. ............ 345/810 |
| 2008/0252593 A1 | 10/2008 | Fukuta |

FOREIGN PATENT DOCUMENTS

| | | |
|---|---|---|
| JP | 3-198117 | 8/1991 |
| JP | 2002-149345 | 5/2002 |
| JP | 2002-157068 | 5/2002 |
| JP | 2002-259009 | 9/2002 |
| JP | 2002-261918 | 9/2002 |
| JP | 2002-333937 | 11/2002 |
| JP | 2002-336188 | 11/2002 |
| JP | 2003-157140 | 5/2003 |
| JP | 2004-112626 | 4/2004 |
| JP | 2005-38038 | 2/2005 |
| JP | 2005-96596 | 4/2005 |
| JP | 2005-284559 | 10/2005 |
| JP | 2006-243952 | 9/2006 |
| JP | 2007-200064 | 8/2007 |
| JP | 2008-118572 | 5/2008 |

OTHER PUBLICATIONS

Office Action mailed Nov. 22, 2011, in Japanese Patent Application No. 2007-000347, filed Jan. 5, 2007.

* cited by examiner

INFORMATION PROCESSING APPARATUS, DISPLAY CONTROL METHOD, AND PROGRAM

CROSS REFERENCES TO RELATED APPLICATIONS

The present invention contains subject matter related to Japanese Patent Application JP 2007-000347 filed in the Japanese Patent Office on Jan. 5, 2007, the entire contents of which are incorporated herein by reference.

BACKGROUND OF THE INVENTION

1. Field of the Invention

The present invention relates to information processing apparatuses, display control methods, and programs and particularly relates to an information processing apparatus, a display control method, and a program for providing a graphical user interface (GUI) that is intuitive and easy to understand.

2. Description of the Related Art

Personal computers with audio visual (AV) capability have been popular in recent years. Some of such personal computers are supplied with a remote control as an accessory, as in the case of AV equipment such as television receivers and hard disk recorders.

With a remote control, the user can change the channel of a television program displayed on a personal computer and can control the volume of music played on the personal computer.

Japanese Unexamined Patent Application Publication No. 2003-157140 discloses a technique for displaying a launcher as a GUI for improved usability. The launcher has buttons, each being assigned a predetermined operation.

SUMMARY OF THE INVENTION

To ensure an easy-to-understand GUI when a remote control (such as that described above) is also provided as an input interface and while, for example, the user is performing operations using the remote control, it is not necessary or is better not to display buttons that can be operated only with a mouse. If buttons that can be operated only with a mouse are displayed even while the user is performing operations using the remote control, the displayed buttons may cause the user to think about how to press them with the remote control.

The present invention addresses the above-described circumstances by providing a GUI that is intuitive and easy to understand.

An information processing apparatus according to an embodiment of the present invention includes a detector and a display controller. The detector detects a user operation performed by using a first input interface and a user operation performed by using a second input interface. When the detector detects that an operation using the second input interface has been performed while a predetermined screen is displayed on the basis of detection of an operation using the first input interface, the display controller changes the predetermined screen to a screen containing an object indicating that the object can be operated by an operation using the second input interface.

The display controller can newly display a button as an object indicating that the object can be operated by an operation using the second input interface.

Of images constituting a menu displayed as the predetermined screen, the display controller can highlight a particular image as an object indicating that the object can be operated by an operation using the second input interface.

When the detector detects that an operation using the second input interface has been performed, the display controller can further display a pointer that is moved according to an operation using the second input interface.

The first input interface can be a remote control and the second input interface can be a mouse.

When a state in which no operation using the second input interface takes place has continued for a predetermined period of time after the change of the predetermined screen, the display controller can change the screen containing an object indicating that the object can be operated by an operation using the second input interface back to the predetermined screen.

A display control method or a program according to an embodiment of the present invention includes the steps of detecting a user operation performed by using a first input interface and a user operation performed by using a second input interface; and changing, when it is detected that an operation using the second input interface has been performed while a predetermined screen is displayed on the basis of detection of an operation using the first input interface, the predetermined screen to a screen containing an object indicating that the object can be operated by an operation using the second input interface.

An embodiment of the present invention makes it possible to detect a user operation performed by using a first input interface and a user operation performed by using a second input interface; and change, when it is detected that an operation using the second input interface has been performed while a predetermined screen is displayed on the basis of detection of an operation using the first input interface, the predetermined screen to a screen containing an object indicating that the object can be operated by an operation using the second input interface.

Thus, an embodiment of the present invention makes it possible to provide a GUI that is intuitive and easy to understand.

DESCRIPTION OF THE PREFERRED EMBODIMENTS

Before describing embodiments of the present invention, the correspondence between the features of the present invention and embodiments disclosed in the specification or drawings is discussed below. This description is intended to assure that embodiments supporting the present invention are disclosed in the specification or drawings. Therefore, even if an embodiment disclosed in the specification or drawings is not described herein as relating to a certain feature of the present invention, that does not necessarily mean that the embodiment does not relate to that feature of the present invention. Conversely, even if an embodiment is described herein as relating to a certain feature of the present invention, that does not necessarily mean that the embodiment does not relate to other features of the present invention.

Figure 8:
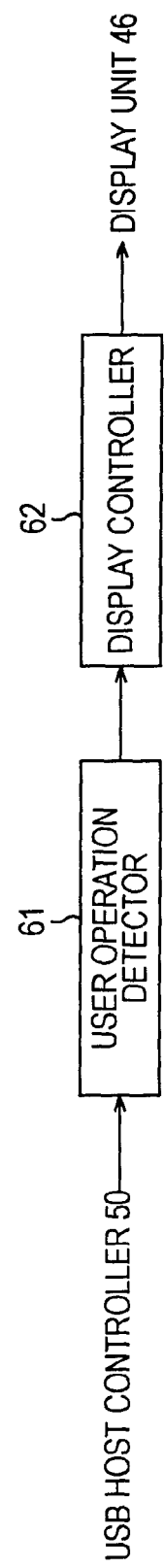
FIG. 8 is a block diagram illustrating an exemplary functional configuration of the information processing apparatus.

An information processing apparatus (e.g., information processing apparatus 1 of FIG. 1) according to an embodiment of the present invention includes a detector (e.g., user operation detector 61 of FIG. 8) and a display controller (e.g., display controller 62 of FIG. 8). The detector detects a user operation performed by using a first input interface and a user operation performed by using a second input interface. When the detector detects that an operation using the second input interface has been performed while a predetermined screen is displayed on the basis of detection of an operation using the first input interface, the display controller changes the predetermined screen to a screen containing an object indicating that the object can be operated by an operation using the second input interface.

A display control method or a program according to an embodiment of the present invention includes the steps of detecting a user operation performed by using a first input interface and a user operation performed by using a second input interface; and changing (e.g., step S3 of FIG. 9), when it is detected that an operation using the second input interface has been performed while a predetermined screen is displayed on the basis of detection of an operation using the first input interface, the predetermined screen to a screen containing an object indicating that the object can be operated by an operation using the second input interface.

Embodiments of the present invention will now be described with reference to the drawings.

Figure 1:
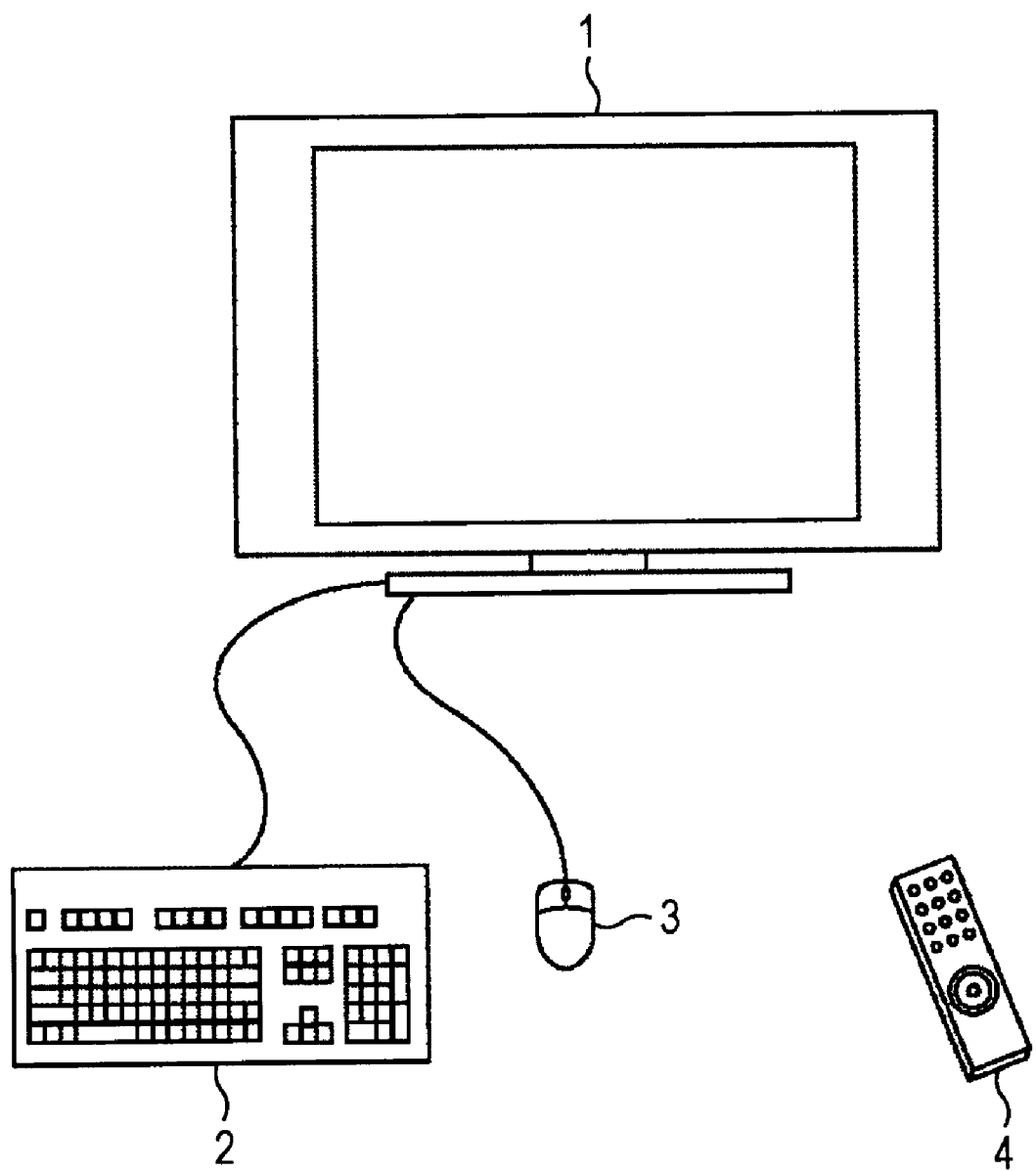
FIG. 1 illustrates an exemplary information processing apparatus according to an embodiment of the present invention.

FIG. 1 illustrates an exemplary information processing apparatus 1 according to an embodiment of the present invention.

As illustrated in FIG. 1, the information processing apparatus 1 is a television receiver. The information processing apparatus 1 includes an operating system (OS), such as Windows (registered trademark) Vista (trademark), and functions as a personal computer as well as the television receiver.

A keyboard 2 and a mouse 3 are connected to the information processing apparatus 1 via universal serial bus (USB) cables. By operating the keyboard 2 and/or the mouse 3, the user can create documents through the use of an application, such as a text editor, running on the OS and can browse Web sites with a Web browser.

The information processing apparatus 1 is supplied with a remote control 4. By operating the remote control 4, the user can change the channel of a television program displayed on a display unit of the information processing apparatus 1 and can control the volume of sound output from a speaker.

For example, the remote control 4 has up, down, left, and right buttons used to select an item by moving a cursor; a confirmation button used to confirm the selected item; and a menu button used to display a menu (or launcher) which allows the user to perform various operations using buttons on the remote control 4.

Figure 2:
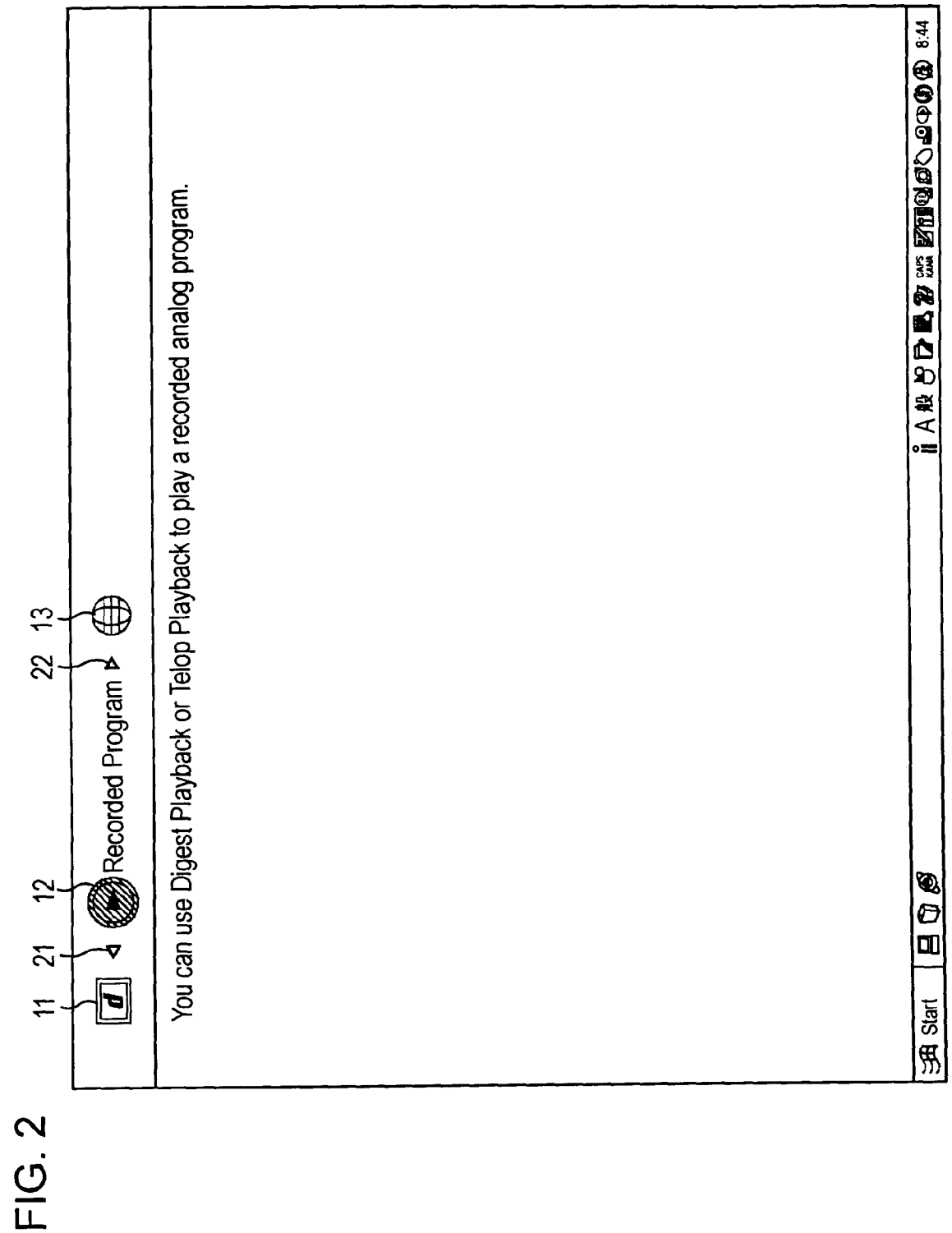
FIG. 2 illustrates an exemplary menu displayed on a display unit.

FIG. 2 illustrates an exemplary menu displayed on the display unit of the information processing apparatus 1.

In the example of FIG. 2, icons 11 to 13 are displayed in an upper part of the screen. Of the icons 11 to 13, the icon 12 is highlighted, for example, by displaying it in a distinctive color. In FIG. 2, the icon 12 is shaded to indicate that the icon 12 is displayed in a color different from those of the other icons.

In FIG. 2, the phrase "Recorded Program" appears to the right of the highlighted icon 12 to describe the function represented by the icon 12. In this example, if the confirmation button on the remote control 4 is pressed in the state of FIG. 2 where the icon 12 is highlighted, the user can select an item, such as playback of a recorded program, as indicated by a description appearing under the icons 11 to 13.

The icon 11 represents a television function which allows the user to view a program broadcast in a digital television broadcast. The icon 13 represents an Internet function which starts a Web browser and allows the user to browse Web sites.

In the example of FIG. 2, a leftward mark 21 pointing leftward is displayed between the icon 11 and the icon 12, while a rightward mark 22 pointing rightward is displayed between the icon 13 and the phrase "Recorded Program" appearing to the right of the highlighted icon 12.

The leftward mark 21 indicates that by pressing the left button among the up, down, left, and right buttons on the remote control 4, the display of the menu can be changed such that the icon 11 displayed to the left of the currently highlighted icon 12 with the leftward mark 21 placed between the icons 11 and 12 is highlighted.

For example, when the left button on the remote control 4 is pressed once in the state of FIG. 2, all the icons are moved rightward together by the width of one icon. Thus, the icon 11 is displayed at the position where the icon 12 is currently displayed, while the icon 12 is displayed at the position where the icon 13 is currently displayed. As a description of the function represented by the icon 11, the phrase "Television Broadcast" or the like appears next to the icon 11. The display of the icon 13 is turned off. At the position where the icon 11 is displayed in FIG. 2, another icon arranged to the left of the icon 11 is newly displayed.

On the other hand, the rightward mark 22 indicates that by pressing the right button among the up, down, left, and right buttons on the remote control 4, the display of the menu can be changed such that the icon 13 displayed to the right of the currently highlighted icon 12 with the phrase "Recorded Program" and the rightward mark 22 placed between the icons 12 and 13 is highlighted.

For example, when the right button on the remote control 4 is pressed once in the state of FIG. 2, all the icons are moved leftward together by the width of one icon. Thus, the icon 13 is displayed at the position where the icon 12 is currently displayed, while the icon 12 is displayed at the position where the icon 11 is currently displayed. As a description of the function represented by the icon 13, the word "Internet" or the like appears next to the icon 13. The display of the icon 11 is turned off. At the position where the icon 13 is displayed in FIG. 2, another icon arranged to the right of the icon 13 is newly displayed.

Thus, by operating the left and right buttons and the confirmation button on the remote control 4, the user can select a predetermined function and a predetermined item from the menu described above.

Figure 3:
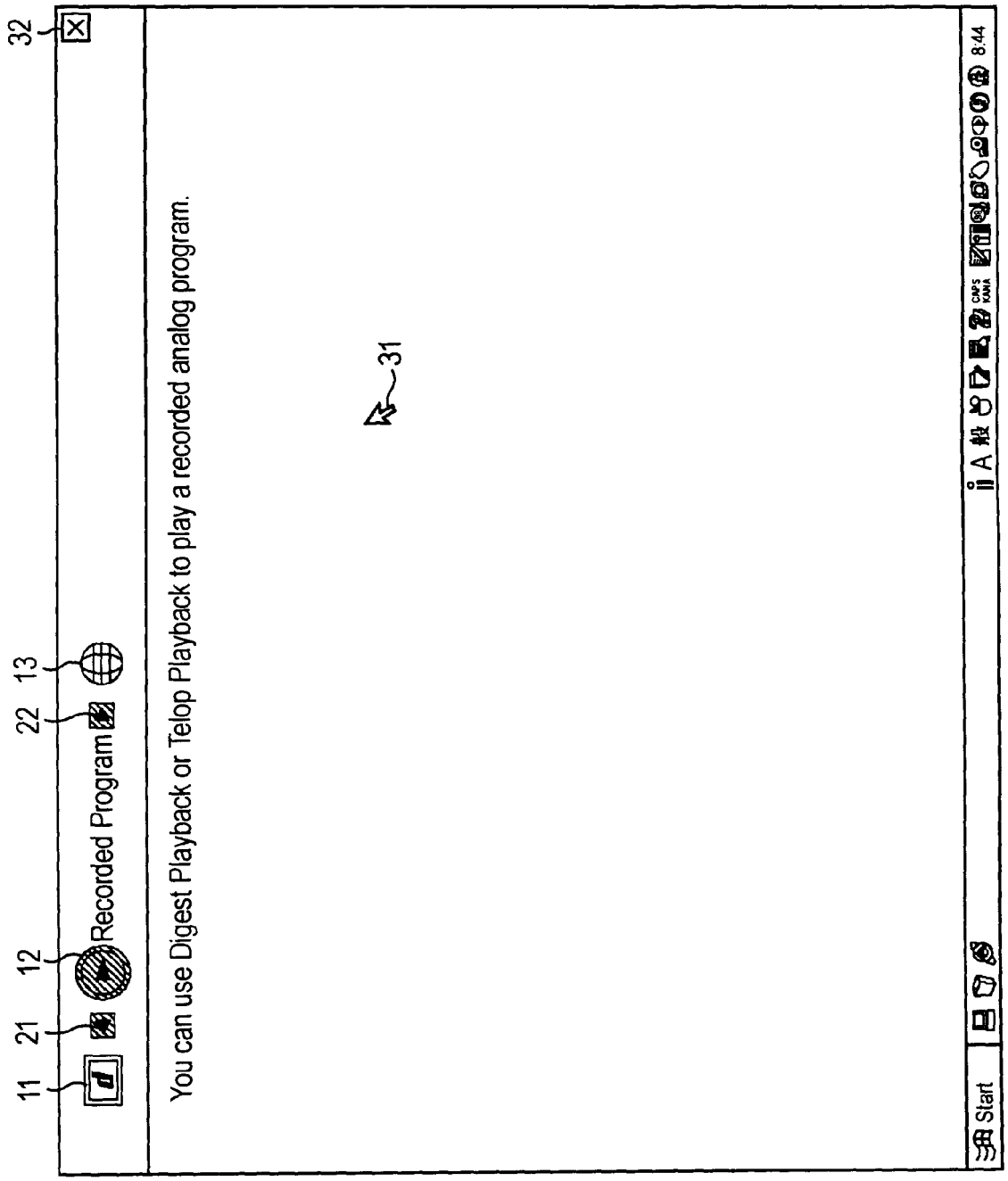
FIG. 3 illustrates another exemplary menu displayed on the display unit.

FIG. 3 illustrates an exemplary menu displayed when it is detected, in the state of FIG. 2, that operation of the mouse 3 has been performed.

When it is detected that operation of the mouse 3 has been performed while the menu of FIG. 2 is displayed, a pointer 31 that moves in response to operation of the mouse 3 appears on the display unit as illustrated in FIG. 3. At the same time, an end button 32 for ending the display of the menu also appears. In the example of FIG. 3, the end button 32 is displayed at the upper right corner of the screen.

Figure 4:
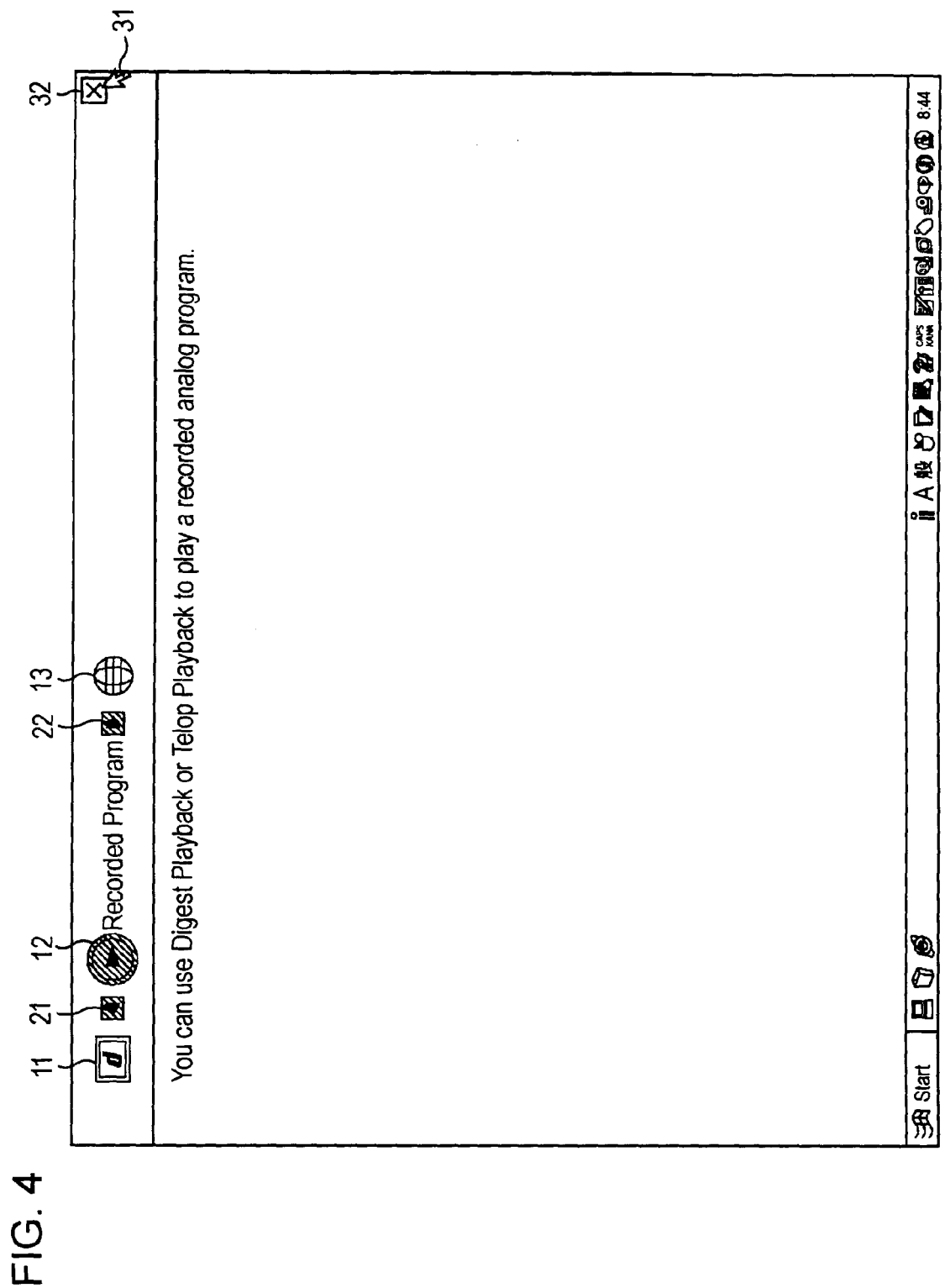
FIG. 4 illustrates still another exemplary menu displayed on the display unit.

By clicking the left button of the mouse 3, with the pointer 31 positioned on the end button 32 as illustrated in FIG. 4, the user can press the end button 32 to close the menu. The remote control 4 also has a button to which a menu-closing operation is assigned. With the mouse 3, the user can perform the same operation as pressing this button.

Since the end button 32 appears when the user operates the mouse 3, the user can intuitively understand that the end button 32 is a button that can be pressed by operating the mouse 3.

If the end button 32 continues to be displayed even while the user is using only the remote control 4, the displayed end button 32 may cause the user to think about how to operate the remote control 4 to press the end button 32. This can be prevented by displaying the end button 32 upon operation of the mouse 3.

Additionally, when it is detected that operation of the mouse 3 has been performed, the leftward mark 21 and rightward mark 22 displayed as images constituting the menu are highlighted as illustrated in FIG. 3. The highlighted leftward mark 21 and rightward mark 22 indicate that by clicking the left button of the mouse 3, with the pointer 31 positioned on the leftward mark 21 or the rightward mark 22, the leftward mark 21 or the rightward mark 22 can be pressed as a button.

When the leftward mark 21 is pressed with the mouse 3, the display can be changed in the same manner as in the case where the left button on the remote control 4 is pressed. Likewise, when the rightward mark 22 is pressed with the mouse 3, the display can be changed in the same manner as in the case where the right button on the remote control 4 is pressed.

Figure 5:
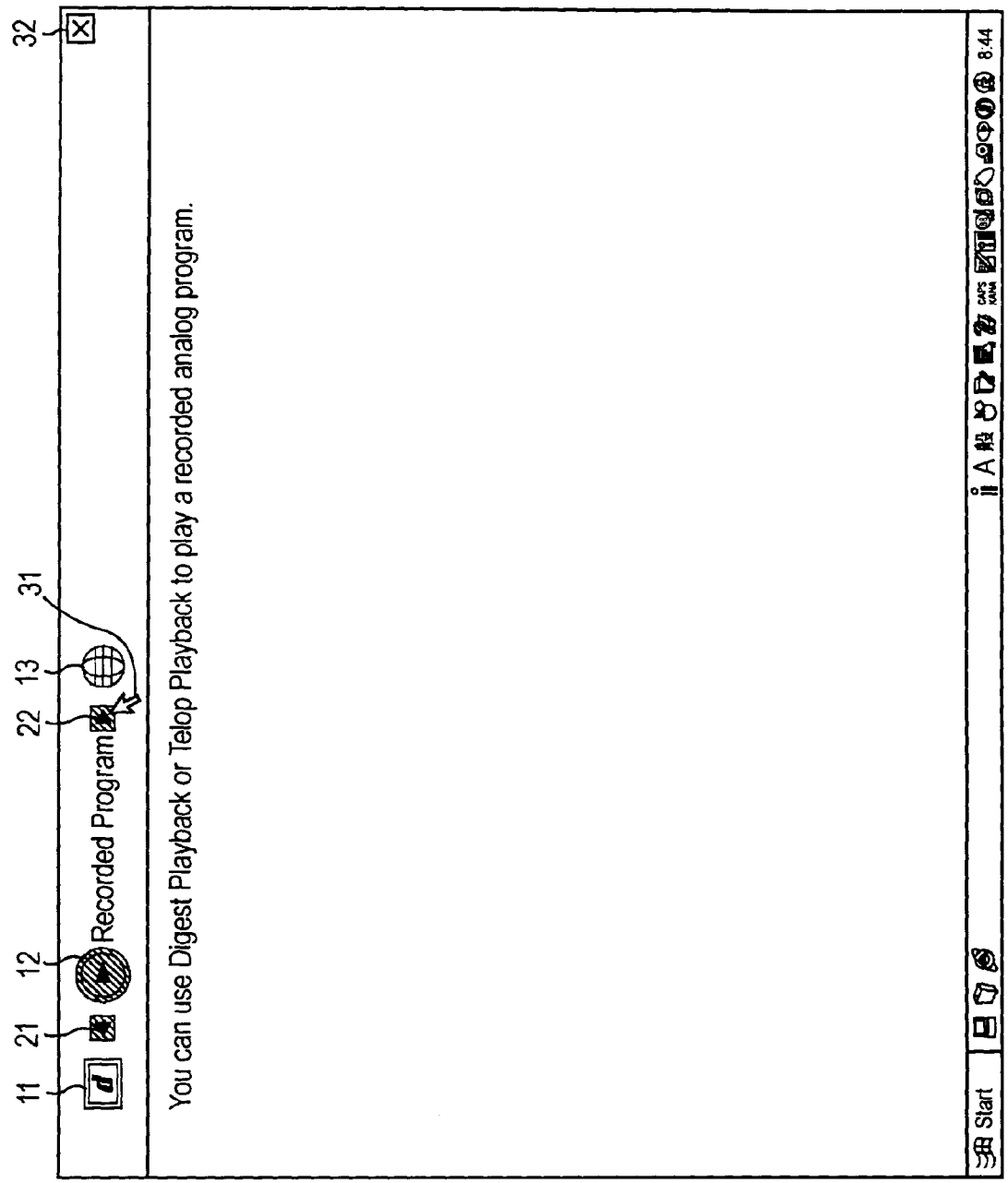
FIG. 5 illustrates an exemplary menu displayed on the display unit.
Figure 6:
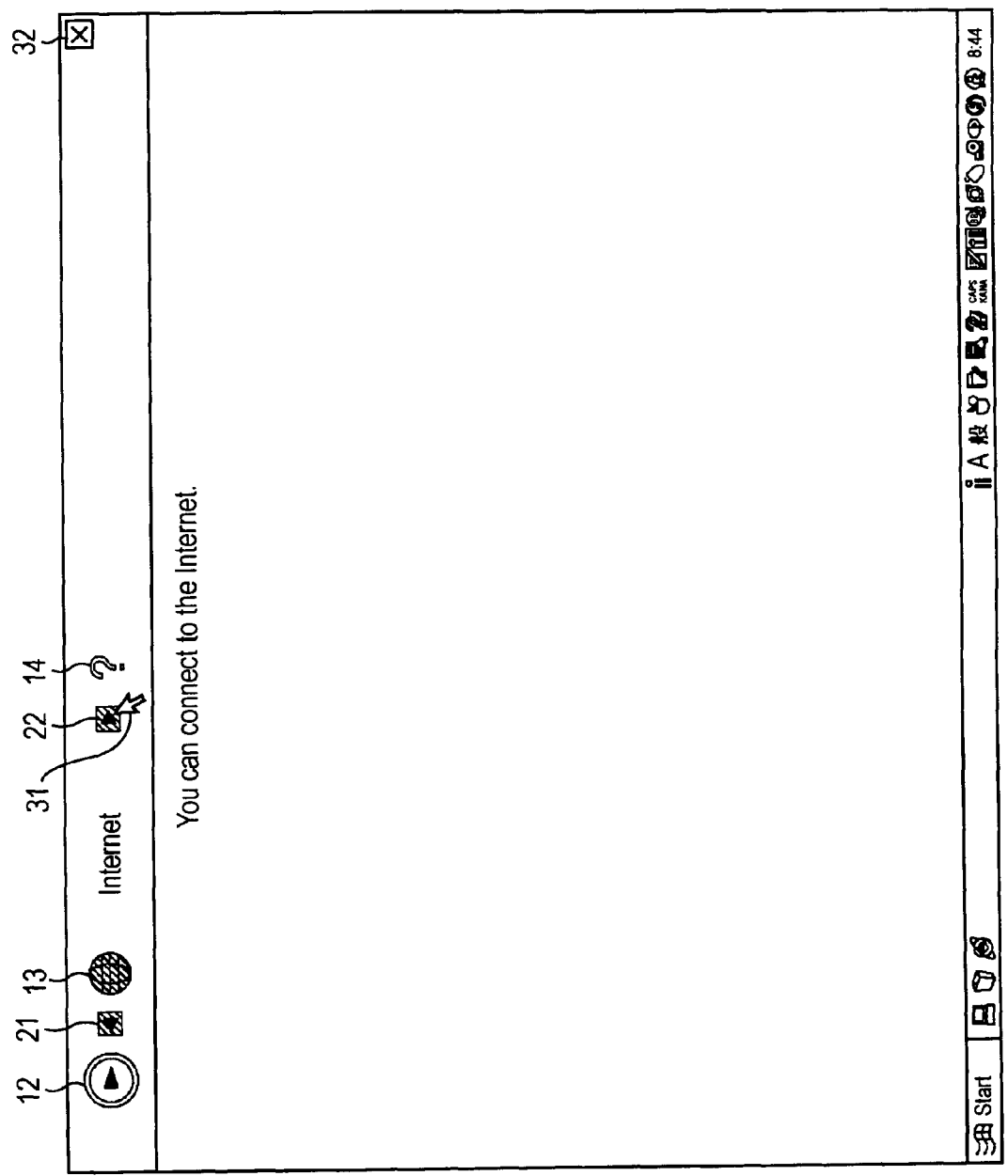
FIG. 6 illustrates another exemplary menu displayed on the display unit.

That is, when the user clicks the left button of the mouse 3 with the pointer 31 positioned on the highlighted rightward mark 22 as illustrated in FIG. 5, the display of the menu is changed to that illustrated in FIG. 6. In the example of FIG. 6, all the icons move leftward together by the width of one icon so as to make the icon 13 to be highlighted. The word "Internet" is displayed next to the highlighted icon 13.

At the same time, the icon 12 is displayed to the left of the icon 13 in a normal color (which is different from a color used for highlighting the icon 13), with the leftward mark 21 placed between the icons 12 and 13. Additionally, an icon 14 is newly displayed to the right of the icon 13, with the word "Internet" and the rightward mark 22 placed between the icons 13 and 14.

Thus, by pressing the leftward mark 21 and rightward mark 22 displayed as operable buttons, the user can select a predetermined function and a predetermined item from the menu, as in the case where the remote control 4 is used.

The leftward mark 21 and the rightward mark 22 are highlighted when the user operates the mouse 3. Therefore, unlike in the case where the leftward mark 21 and the rightward mark 22 continue to be highlighted even while the user is using only the remote control 4, the user can intuitively understand that the leftward mark 21 and the rightward mark 22 are buttons that can be pressed with the mouse 3. In other words, it is made possible to realize an interface that is intuitive and easy to understand for the user.

Like the icons 11 to 13, the end button 32 is an object indicating that it can be operated with the mouse 3. The highlighted leftward mark 21 and rightward mark 22 illustrated in FIG. 3 are exemplary objects indicating that they can be operated with the mouse 3.

Therefore, in the example of FIG. 3, the menu serving as a GUI contains objects indicating that they can be operated with the mouse 3.

Processing carried out by the information processing apparatus 1 for changing the display of the menu in the above manner will be described below with reference to a flowchart.

Figure 7:
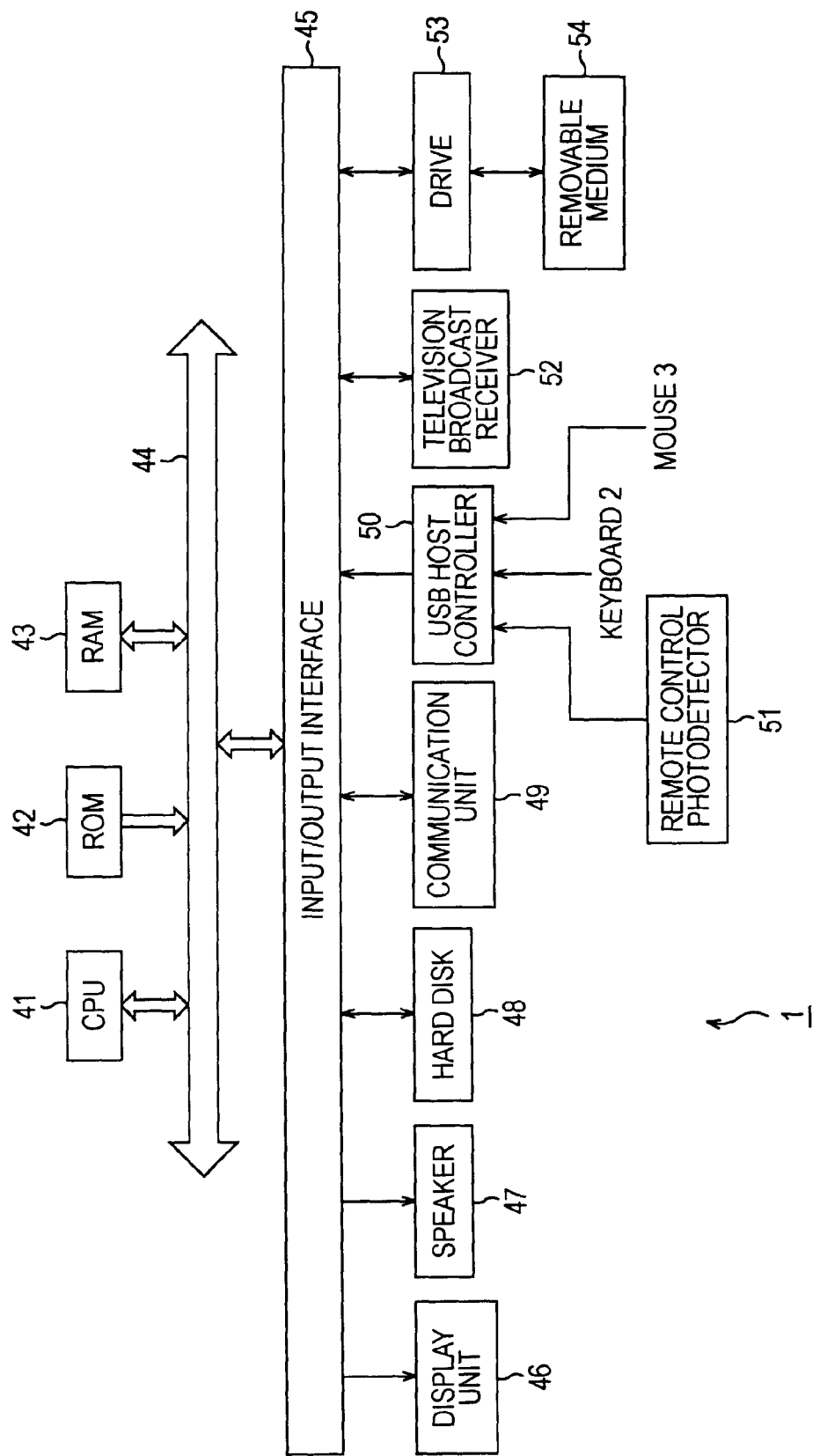
FIG. 7 is a block diagram illustrating an exemplary hardware configuration of the information processing apparatus.

FIG. 7 is a block diagram illustrating an exemplary hardware configuration of the information processing apparatus 1.

The central processing unit (CPU) 41 executes various processing according to a program stored in a read-only memory (ROM) 42 or a program loaded from a hard disk 48 to a random-access memory (RAM) 43. Data necessary for the CPU 41 to execute various processing is stored in the RAM 43.

The CPU 41, the ROM 42, and the RAM 43 are connected to each other via a bus 44. An input/output interface 45 is also connected to the bus 44.

A display unit 46, such as a liquid crystal display (LCD), a speaker 47, a hard disk 48, and a communication unit 49 capable of communicating via a network are connected to the input/output interface 45.

A USB host controller 50, a television broadcast receiver 52, and a drive 53 are also connected to the input/output interface 45.

A remote control photodetector 51 is connected to the USB host controller 50 as a USB device. The USB host controller 50 receives a signal sent out from the remote control 4 and received by a remote control photodetector 51. The USB host controller 50 also receives signals from the keyboard 2 and mouse 3 connected thereto as USB devices.

The television broadcast receiver 52 receives a signal from an antenna (not shown) capable of receiving a television broadcast wave. Then, the television broadcast receiver 52 obtains data of a television program broadcast on a predetermined channel. The television program data obtained by the television broadcast receiver 52 is supplied via the input/output interface 45 to the display unit 46 and used for displaying the program or supplied to the hard disk 48 and recorded therein.

A removable medium 54, for example, an optical disc, such as a Blu-ray Disc (registered trademark) or a digital versatile disc (DVD), is placed in the drive 53. A computer program read from the removable medium 54 by the drive 53 is installed in the hard disk 48 as necessary.

FIG. 8 is a block diagram illustrating an exemplary functional configuration of the information processing apparatus 1. At least part of the functional unit illustrated in FIG. 8 is realized when a predetermined program is executed by the CPU 41 of FIG. 7.

As illustrated in FIG. 8, a user operation detector 61 and a display controller 62 are realized in the information processing apparatus 1. A signal received by the USB host controller 50 is input to the user operation detector 61.

On the basis of the signal supplied from the USB host controller 50, the user operation detector 61 detects a user operation performed with the keyboard 2, a user operation performed with the mouse 3, or a user operation performed with the remote control 4. Then, the user operation detector 61 informs the display controller 62 of the detected user operation.

According to the user operation informed by the user operation detector 61, the display controller 62 changes the display on the display unit 46. For example, as described above, when operation of the mouse 3 is performed while a menu is displayed on the basis of the fact that operation of the remote control 4 is taking place, the display controller 62 changes the display of the menu to one in which a button that can be operated with the mouse 3 is highlighted and a new button that can be operated with the mouse 3 is displayed.

Figure 9:
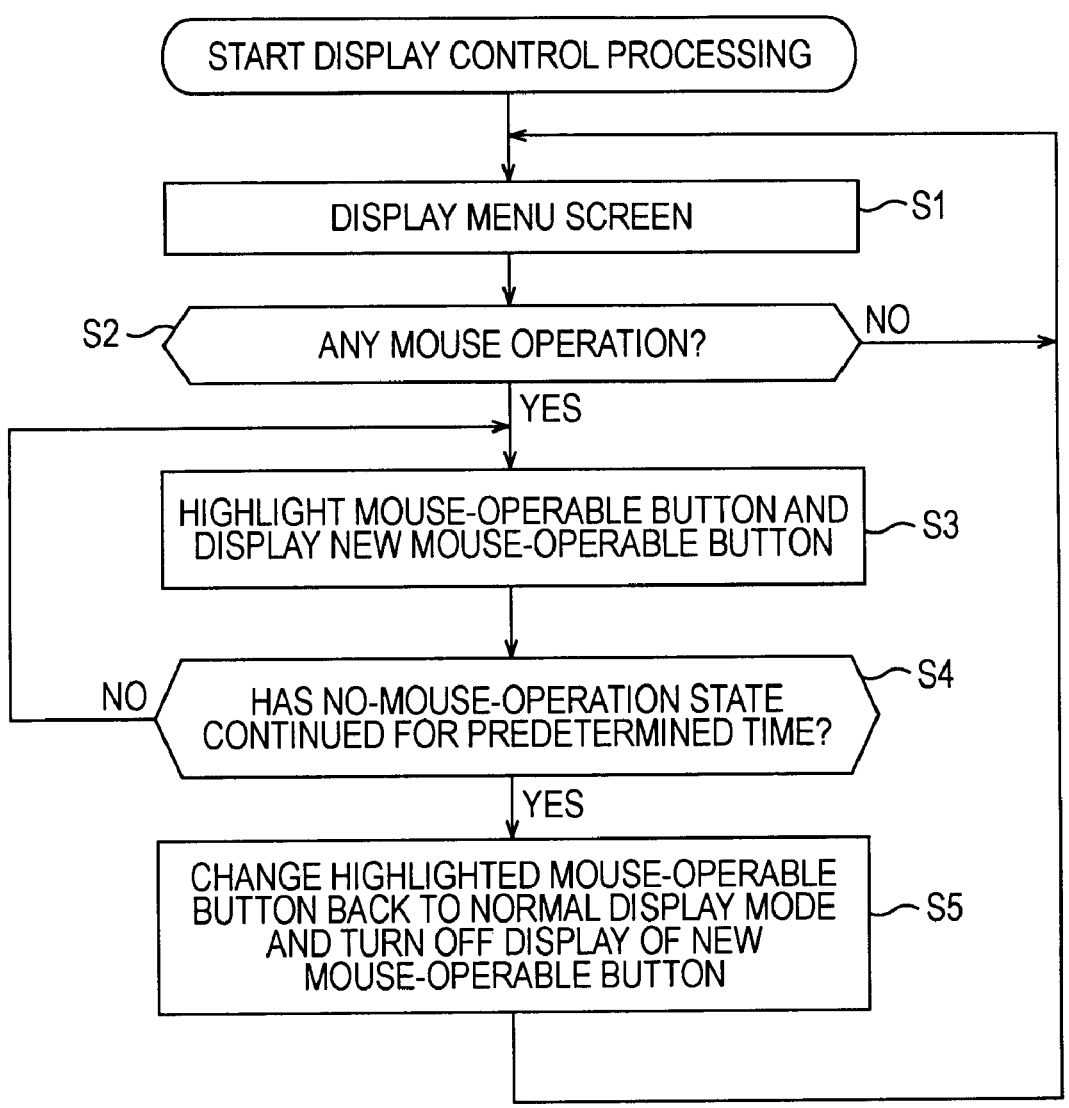
FIG. 9 is a flowchart illustrating display control processing carried out by the information processing apparatus.

Now, with reference to the flowchart of FIG. 9, processing carried out by the information processing apparatus 1 for controlling the display on the display unit 46 will be described.

This processing starts, for example, when the user presses the menu button on the remote control 4 to instruct a menu to be displayed. An operation performed by the user with the remote control 4 is detected and informed to the display controller 62 by the user operation detector 61.

In step S1, the display controller 62 causes the menu illustrated in FIG. 2 to be displayed on the display unit 46. Since no operation of the mouse 3 is performed here, a button that can be operated with the mouse 3 is not either highlighted or newly displayed.

In step S2, on the basis of a signal supplied from the USB host controller 50, the user operation detector 61 determines whether operation of the mouse 3 has been performed by the user.

Until it is determined in step S2 that operation of the mouse 3 has been performed, the display controller 62 continues displaying, in step S1, on the display unit 46 a menu which does not contain a button that can be operated with the mouse 3. In response to a press of a button on the remote control 4, the display of the menu is changed as necessary.

On the other hand, if it is determined in step S2 that operation of the mouse 3 has been performed, the processing proceeds to step S3. In step S3, the display controller 62 highlights, as buttons, particular images that can be pressed by operation of the mouse 3, among images (e.g., icons and marks) constituting the menu. At the same time, the display controller 62 newly displays a button that can be pressed by operation of the mouse 3. Additionally, the display controller 62 displays the pointer 31 that is moved according to operation of the mouse 3.

Thus, as illustrated in FIG. 3, the leftward mark 21 and rightward mark 22 displayed as images constituting the menu are highlighted, while the end button 32 is newly displayed at the upper right corner of the screen.

In step S4, on the basis of a signal supplied from the USB host controller 50, the user operation detector 61 determines whether a state where no operation of the mouse 3 takes place has continued for a predetermined period of time, such as five seconds.

Until it is determined in step S4 that a state where no operation of the mouse 3 takes place has continued for a predetermined period of time, the display controller 62 continues displaying in step S3 the menu which contains buttons and the like that can be operated with the mouse 3.

On the other hand, if it is determined in step S4 that a state where no operation of the mouse 3 takes place has continued for a predetermined period of time, the processing proceeds to step S5. In step S5, the display controller 62 restores the display of the buttons highlighted to indicate that they can be pressed by operation of the mouse 3 to normal mode. At the same time, the display controller 62 turns off the display of the button displayed to indicate that it can be pressed by operation of the mouse 3. Additionally, the display controller 62 turns off the display of the pointer 31.

Thus, the highlighted leftward mark 21 and rightward mark 22 are made to be displayed in a normal color, while the display of the pointer 31 and end button 32 are turned off. The display of the menu is changed, for example, from the state of FIG. 3 back to the previous state illustrated in FIG. 2.

After the highlighted mode returns to normal mode and the display of the above-described button and the like is turned off, the processing returns to step S1. In step S1, the display controller 62 displays the menu illustrated in FIG. 2, which does not contain either a button that can be operated with the mouse 3 or a button highlighted to indicate that it that can be operated with the mouse 3. Then, the display controller 62 repeats the steps that follow.

Thus, the above-described processing makes it possible to realize an interface that is intuitive and easy to understand for the user.

In the processing described above, the display of the screen is changed upon detection of operation of the mouse 3 while operation of the remote control 4 is being performed. However, the display of the screen may be changed upon detection of operation of the remote control 4 while operation of the mouse 3 is being performed. For example, a cursor which is not displayed while operation of the mouse 3 is being performed may be displayed upon detection of operation of the remote control 4. The cursor is moved in response to a press of the up, down, left, or right button on the remote control 4 and is used, for example, to select an item.

The above description refers to the case where display is changed when the user uses the mouse 3 or the remote control 4 as an input interface to perform operations. However, the display may be changed when the user uses another input interface, such as the keyboard 2, to perform operations.

Although the above description refers to the case where display is changed by highlighting particular images that can be pressed by the user with the mouse 3 and by displaying a new button that can be pressed by the user with the mouse 3, the change of display is not limited to this.

Figure 10:
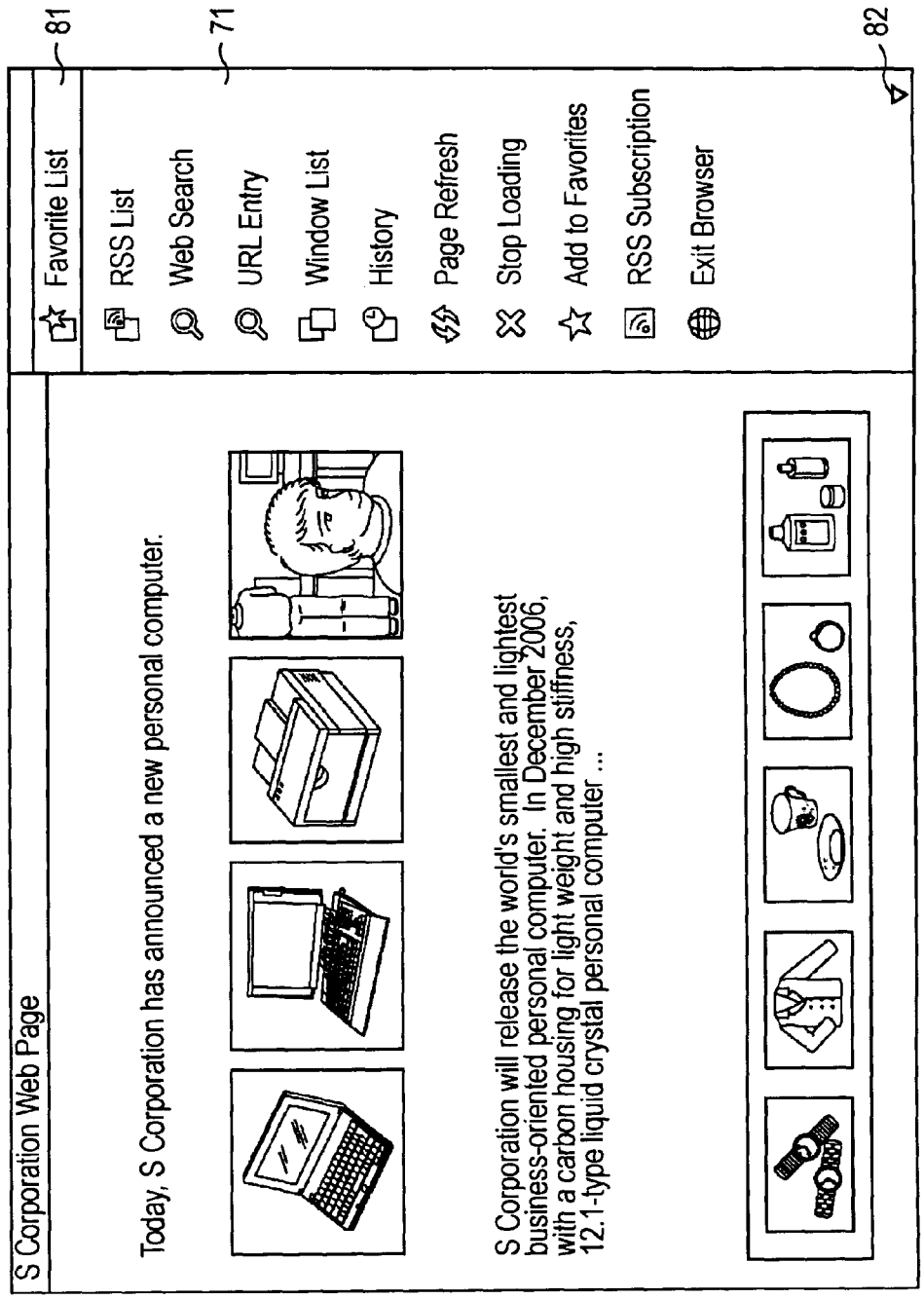
FIG. 10 illustrates an exemplary screen displayed on the display unit.

FIG. 10 illustrates an exemplary screen displayed on the display unit 46 by a Web browser.

In the example of FIG. 10, the menu button on the remote control 4 is operated while a predetermined Web site is displayed by the Web browser. Then, in response to the operation of the menu button, a menu 71 containing a list of items selectable by the user is displayed at the right end of the screen. By pressing the up or down button on the remote control 4, the user can move a cursor 81 onto a predetermined item of the menu 71.

A downward mark 82 pointing downward is displayed at the lower right corner of the menu 71. The downward mark 82 indicates that further lower part of the menu 71 can be displayed by pressing the down button on the remote control 4.

Figure 11:
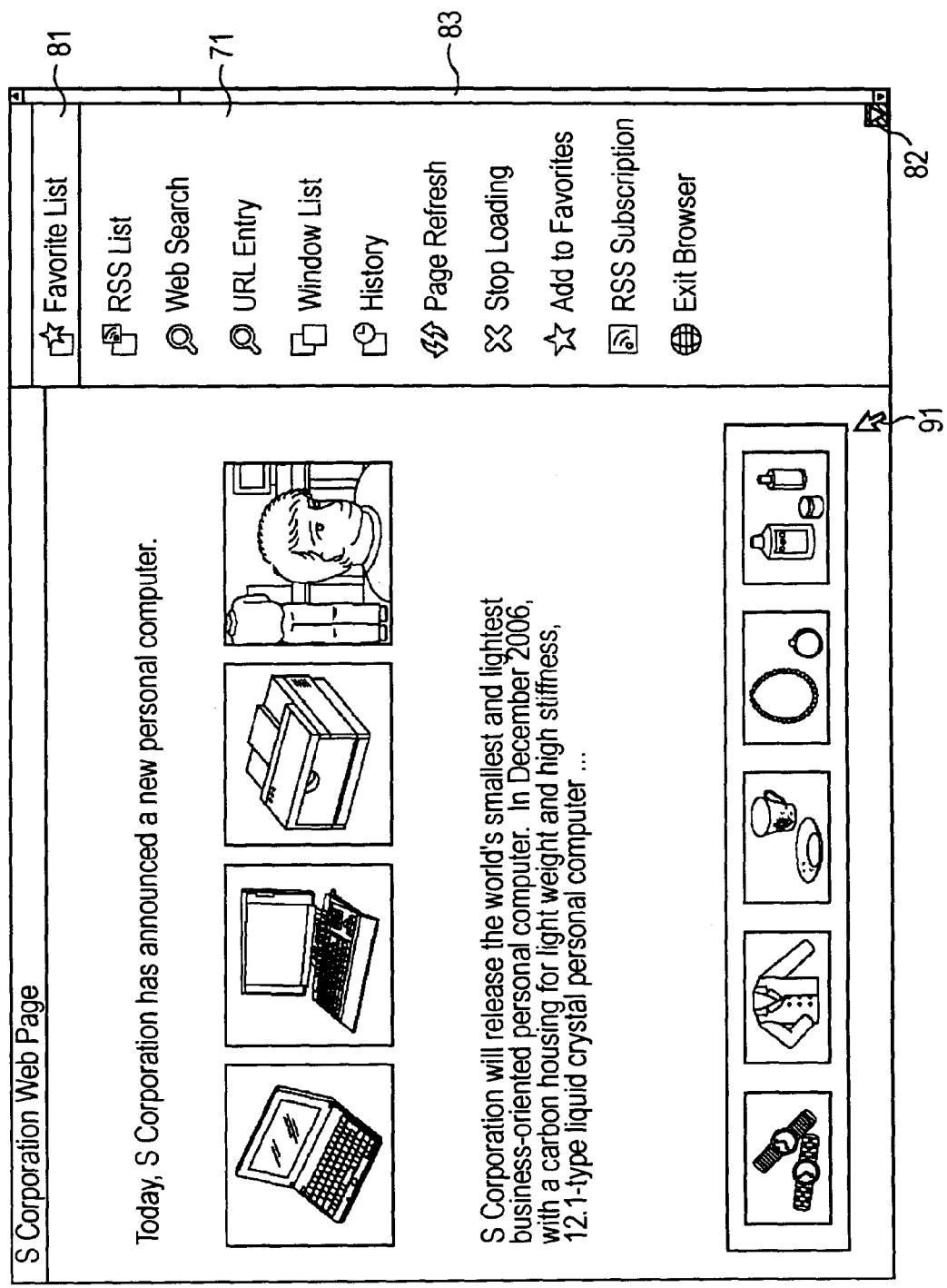
FIG. 11 illustrates another exemplary screen displayed on the display unit.

FIG. 11 illustrates an exemplary screen displayed when it is detected that operation of the mouse 3 has been performed in the state of FIG. 10.

In the example of FIG. 11, a pointer 91 and a slide bar 83 are newly displayed. The pointer 91 is moved according to operation of the mouse 3. The slide bar 83 is operated to change the displayed area of the menu 71. The slide bar 83, which is an exemplary GUI, is an object indicating that it can be operated with the mouse 3. By clicking the left button of the mouse 3 with the pointer 91 placed on the slide bar 83, the user can operate the slide bar 83 and change the displayed area of the menu 71, as in the case where the down button on the remote control 4 is pressed.

In the example of FIG. 11, the downward mark 82 is highlighted to indicate that it is a button that can be pressed by operation of the mouse 3.

Instead of the button described above, it is also possible to display a slide bar or the like.

The information processing apparatus 1 has been described as an apparatus having the form of a typical television receiver. However, as illustrated in FIG. 12, the information processing apparatus 1 may be implemented as a box apparatus which is different from a television receiver.

Figure 12:
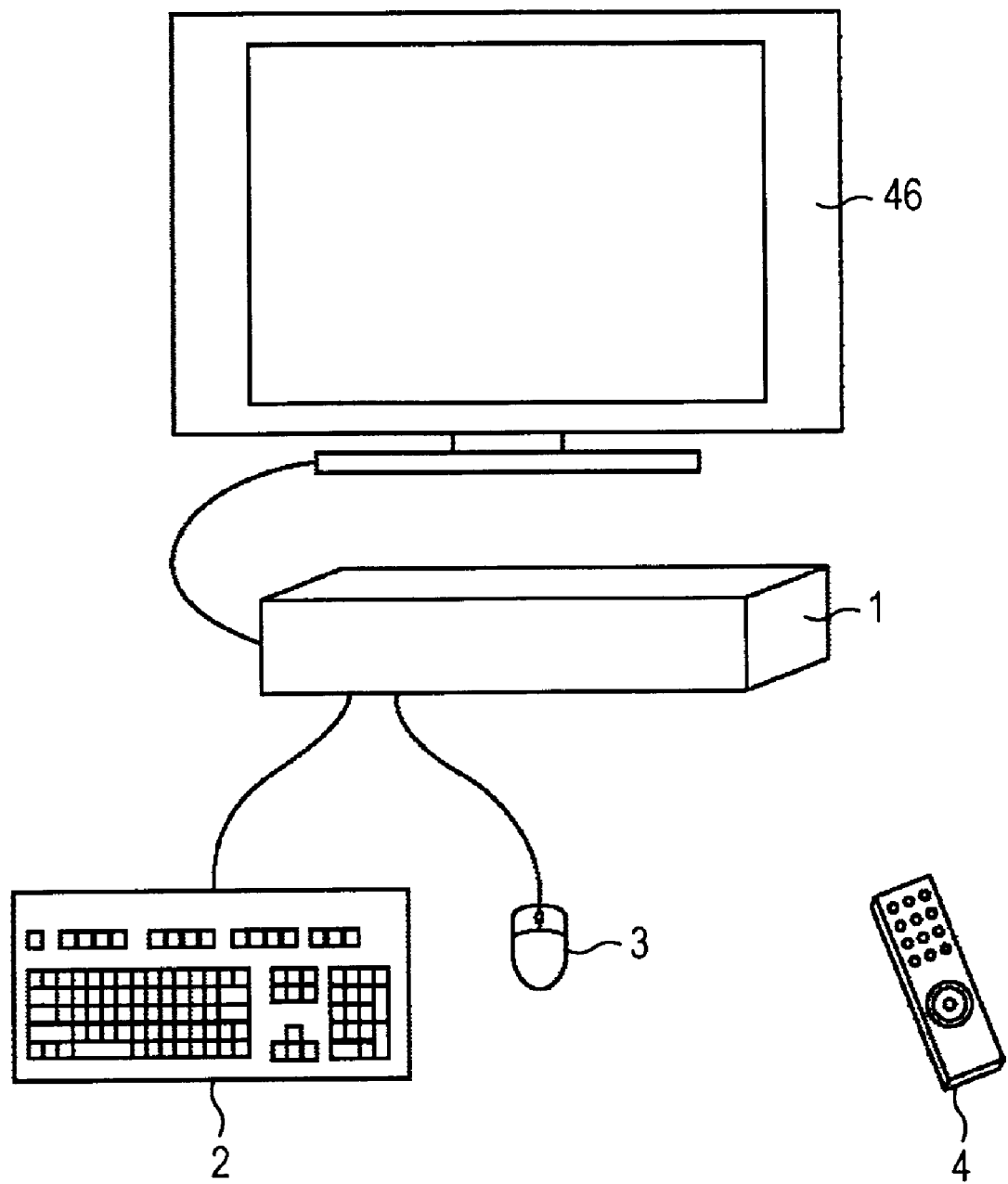
FIG. 12 is another diagram illustrating the information processing apparatus.

In the example of FIG. 12, the display unit 46 is connected to the information processing apparatus 1 via a cable. Then, display on the display unit 46 is controlled by the information processing apparatus 1 as described above. The keyboard 2 and the mouse 3 are also connected to the information processing apparatus 1, which includes a photodetector capable of detecting a signal from the remote control 4.

The series of processing described above can be executed either by hardware or software. When the series of processing is executed by software, programs constituting the software are installed from a program storage medium onto a computer included in dedicated hardware or, for example, onto a general-purpose personal computer capable of executing various functions by installing various programs thereto.

For example, a program executed by the computer is supplied from the removable medium 54, such as an optical disc, or via a wired or wireless transmission medium, such as a local area network, the Internet, or digital satellite broadcasting.

Then, the program can be installed on the hard disk 48 via the input/output interface 45 by placing the removable medium 54 in the drive 53. Alternatively, the program can be received by the communication unit 49 via a wired or wireless transmission medium and installed on the hard disk 48.

The program executed by the computer may either be a program which allows processing steps to be sequentially performed in the order described in the present specification, or a program which allows processing steps to be performed in parallel or when necessary, such as when the program is called.

Embodiments of the present invention are not limited to those described above, and various modifications may be made without departing from the scope of the present invention.

What is claimed is:

1. An information processing apparatus comprising:
   detecting means for detecting a user operation performed by using a button input interface and a user operation performed by using a cursor input interface; and
   display control means for changing, in response to the detecting means detecting an operation from the cursor input interface while displaying a button screen format configured for operation by the button input interface, a display of the button screen format to a cursor screen format containing a newly displayed object, indicating that the newly displayed object can be operated by an operation using the cursor input interface, wherein
   in response to the detecting means determining a state in which no operation from the cursor input interface takes place has continued for a predetermined period of time after the change from the button screen format to the cursor screen format, the display control means changes from the cursor screen format back to the button screen format, removing the newly displayed object from the display.

2. The information processing apparatus according to claim 1, wherein the display control means newly displays a cursor-operated button as the newly displayed object.

3. The information processing apparatus according to claim 1, wherein, of images constituting a menu displayed in the button screen format, the display control means highlights, relative to other images constituting the menu, a newly displayed image as the newly displayed object to indicate that the object can be operated by an operation using the cursor input interface.

4. The information processing apparatus according to claim 1, wherein the display of the cursor screen format includes initiating display of a pointer that is moved according to an operation from the cursor input interface.

5. The information processing apparatus according to claim 1, wherein the button input interface is a remote control and the cursor input interface is a mouse.

6. A display control method comprising:
   detecting a user operation performed by using a button input interface and a user operation performed by using a cursor input interface;
   changing, in response to detecting that an operation from the cursor input interface while displaying a button screen format configured for operation by the button input interface, a display of the button screen format a cursor screen format containing a newly displayed object, indicating that the newly displayed object can be operated by an operation using the cursor input interface;
   determining a state in which no operation from the cursor input interface takes place has continued for a predetermined period of time after the change from the button screen format to the cursor screen format; and
   changing, in response to the determining, the display from the cursor screen format back to the button screen format, removing the newly displayed object from the display.

7. A tangible computer readable medium including a program causing a computer to execute processing comprising:
   detecting a user operation performed by using a button input interface and a user operation performed by using a cursor input interface;
   changing, in response to detecting an operation from the cursor input interface while displaying a button screen format configured for operation by the button input interface, a display of the button screen format to a cursor screen format containing a newly displayed object, indicating that the newly displayed object can be operated by an operation using the cursor input interface;
   determining a state in which no operation from the cursor input interface takes place has continued for a predetermined period of time after the change from the button screen format to the cursor screen format; and
   changing, in response to the determining, the display from the cursor screen format back to the button screen format, removing the newly displayed object from the display.

8. An information processing apparatus comprising:
   a detector that detects a user operation performed by using a button input interface and a user operation performed by using a cursor input interface; and
   a display controller that changes, in response to the detector detecting an operation from the cursor input interface while displaying a button screen format configured for operation by the button input interface, a display of the button screen format to a cursor screen format containing a newly displayed object, indicating that the newly displayed object can be operated by an operation using the cursor input interface, wherein
   in response to the detector determining a state in which no operation from the cursor input interface takes place has continued for a predetermined period of time after the change from the button screen format to the cursor screen format, the display controller changes from the cursor screen format back to the button screen format, removing the newly displayed object from the display.

9. The information processing apparatus according to claim 4, wherein:
   in response to the display control means changing from the cursor screen format back to the button screen format, the display control means removes the display of the pointer.

10. The information processing apparatus according to claim 1, wherein in response to the detecting means determining the state in which no operation from the cursor input interface takes place has continued for the predetermined period of time after the change from the button screen format to the cursor screen format, the display control means changes from the cursor screen format directly back to the button screen format.

* * * * *